United States Patent Office 3,674,510
Patented July 4, 1972

3,674,510
METHOD AND COMPOSITION FOR PREVENTING DECAY OF FRUIT AND INHIBITING SPORULATION THEREON
John R. Bice and Philip J. Lewis, Corona, Calif., assignors to Brogdex Company, Pomona, Calif.
No Drawing. Filed July 10, 1970, Ser. No. 53,996
Int. Cl. A23b 7/14
U.S. Cl. 99—154                                 6 Claims

ABSTRACT OF THE DISCLOSURE

A method for simultaneously controlling molds and fungi, which cause decay of fruit, and inhibiting sporulation of said molds and fungi on said fruit, by directly contacting the surface of such fruits with 2-(4-thiazolyl)benzimidazole and an alkali metal salt of ortho-phenyl phenol tetrahydrate, the amount of 2-(4-thiazolyl)benzimidazole applied to said fruit being sufficient to leave a residue on the surface of said fruit of 1 to 2 parts per million, by weight based on the weight of the fruit, and the amount of the alkali metal salt of ortho-phenyl phenol tetrahydrate applied to said fruit being sufficient to leave a residue on the surface of said fruit of from 5 parts per million to 10 parts per million, by weight expressed as ortho-phenyl phenol, based on the weight of the fruit.

BACKGROUND OF THE INVENTION

All fruit, after they have been harvested, are subject to attack by organisms such as molds or fungi which cause decay of the picked fruit. Decay of fresh fruit is a serious problem and causes losses in the millions of dollars.

In addition to decay of fresh fruit there is a problem of the sporulation of molds and fungi which are growing on the fruit. Molds and fungi will attack and cause decay of the specific fruit which they are in contact with, and if they sporulate the molds and fungi spoil adjacent fruit and render them unsellable.

In the past, generally one compound was applied to the fruit in order to prevent decay of the fruit due to molds and fungi and another compound applied to the surface of the fruit in order to prevent or inhibit sporulation of said molds and fungi. It is self-evident that utilizing two separate operations to prevent decay and sporulation is uneconomical and, in addition, the most prevalent compound (biphenyl) utilized in preventing sporulation of fruit has many objectionable disadvantages, such as the very strong odor found on fruit treated with biphenyl.

It has therefore long been a desideratum in the art to discover a composition of matter which could replace biphenyl as a sporulation inhibitor and also to develop a composition of matter which could both prevent decay on fresh fruit and inhibit sporulation of molds and fungi growing on such fruit.

SUMMARY OF THE INVENTION

We have discovered that compositions of matter containing 2-(4-thiazolyl)benzimidazole (hereinafter TBZ) and an alkali metal salt of ortho-phenyl phenol tetrahydrate (hereinafter AOPP), in certain critical amounts, are effective in simultaneously controlling or inhibiting molds and fungi which cause decay in fruits and inhibiting sporulation of said molds and fungi, without adverse side effects. The compositions and methods of this invention are particularly effective on citrus fruit such as lemons and oranges but are also effective on other fruit such as apples, peaches, etc.

Both TBZ and AOPP, which are the active ingredients of the compositions of this invention, have been utilized heretofore in preventing decay of fruit. The Food and Drug Administration has approved the use of these two compounds in preventing decay of fruit providing that the TBZ residue left on the fruit does not exceed 2 parts per million by weight and the AOPP residue (expressed as ortho-phenyl phenol) does not exceed 10 parts per million.

Since these two compounds do not adversely affect the appearance or color of the fruit and do not have objectionable odors it would be desirable if these compounds could replace biphenyl and the other objectionable compounds utilized in preventing sporulation of molds and fungi growing on the fruit. However, when TBZ and AOPP are utilized in dosages permissible by the Food and Drug Administration neither compound will inhibit sporulation of molds and fungi to any significant extent.

It is, therefore, an object of this invention to provide new and useful compositions of matter which control or inhibit molds and fungi which cause decay of fresh fruit.

Another object of this invention is to provide and embody a method for simultaneously controlling molds and fungi which cause decay of fresh fruit and inhibiting the sporulation of such molds and fungi in order to prevent soiling of adjacent fruit.

A further object of the present invention is to disclose a synergistic composition of matter which, when applied to the surface of fresh fruit, will simultaneously inhibit molds and fungi and prevent the sporulation thereof.

Another and further object of this invention is to disclose and provide compositions of matter containing TBZ and AOPP, the weight ratio of TBZ to AOPP (expressed as ortho-phenyl phenol) being from 1:2.5-10.

Still another object of this invention is to provide composition of matter possessing fungistatic properties which can be applied to fruit in wax formulations and which obviate the necessity of subjecting the fruit to a subsequent step in order to prevent sporulation of molds and fungi.

These and other objects will be readily apparent by reference to the following discussion and claims.

DESCRIPTION OF THE INVENTION

The present invention is predicated on the surprising discovery that a synergistic result is obtained by applying both TBZ and AOPP in amounts equal to or less than that approved by the Food and Drug Administration to fruits.

The TBZ and AOPP can be applied to the fruit separately or in the same composition. That is, the AOPP may be applied first, for example, in solution in a foam for washing the fruit and the TBZ applied later. For example, the TBZ can also be applied in a so called water eliminator rinse, which removes the foam from the fruit.

In the alternative, the TBZ can be first applied in the form of an aqueous dispersion and thereafter a composition containing both TBZ and AOPP can be applied, providing that the total amount of TBZ remaining on the fruit does not exceed about 2 parts per million by weight, based on the weight of the fruit.

It should be noted that in the following examples all parts are by weight unless expressly stated otherwise. In addition, the residue of AOPP is expressed in parts by weight based on the amount of ortho-phenyl phenol (OPP) rather than on the hydrated alkali metal form. The reason for this is because this is the manner in which the Food and Drug Administration sets a limit on the amount of residue permissible on the fruit and because the weight obviously depends upon the particular metal utilized and the amount of water combined in the basic compound. Therefore, in speaking of the residue of AOPP it will be understood that throughout the specification and claims the amount of AOPP is expressed as the amount of OPP left on the fruit. However, when speaking of the amount of AOPP in a particular composition, the amount is by weight based on the AOPP unless expressly indicated.

Salts of ortho-phenyl phenol which have proven particularly effective in the context of the present invention are the alkali metal salts such as potassium and sodium. The alkali metal salts are all water-soluble in the concentrations invisioned in this invention and therefore it is convenient to utilize these alkali metal salts in aqueous compositions so that the AOPP is in solution.

TBZ is not water-soluble to any significant extent and therefore when utilized in an aqueous composition it is preferred to have a dispersion thereof. However, since TBZ is soluble in a number of organic solvents the use of such solvents are not excluded and it is contemplated that the solvent can be miscible in water thereby having a solution of TBZ and AOPP. But, it should be emphasized that AOPP and TBZ can be applied directly to the fruit as a solution, suspension, dispersion, foam or any other manner. If the TBZ and AOPP is applied directly to the fruit in the amounts specified such treatment will inhibit organisms which cause decay and concurrently prevent formation of spores on the surface of any decayed fruit thereby preventing soilage of adjacent sound fruit by the spores.

The TBZ and AOPP, either separately or together, can be formulated with waxes, resins, or coloring material used to enhance appearance or to improve gloss or to retard shrinkage of the fruit in question. Various methods of application may be used, such as washing, dipping, spraying or rubbing.

It is generally preferred to have a residue of TBZ on the fruit as close to the legal permissible limit as possible, i.e. 2 parts per million. However, we have discovered that if the TBZ is present anywhere from 1 part to 2 parts per million satisfactory results are obtained, although the higher the concentration the better, e.g. from 1.4 to 2 parts per million. The particularly preferred range would be to have a TBZ residue on the fruit between 1.3 and 2 parts per million (e.g. over 1.5 parts per million).

It is similarly desirable to have the residue of AOPP on the fruit be at its permissible legal limit, i.e. 10 parts per million. Here again, very good results have been obtained by utilizing an amount of AOPP which results in a residue of from about 5 (e.g. 6) parts to 7 parts per million on the fruit but in certain instances better sporulation control has been obtained when a residue of from 8 to 10 parts per million remains on the fruit.

In the following example, TBZ and sodium ortho-phenyl phenol (SOPP) were added to a wax formulation having the following formula:

| Constituent: | Amount (pts. by wt.) |
| --- | --- |
| Water | 76 |
| Protein | 1.3 |
| PW [1] | 17 |
| Shellac | 3 |

[1] PW is a polyethyleneoxide wax composed of 40 parts by weight of Epolene 45 (low molecular polyethylene oxide resin), 7 parts by weight of oleic acid and 5 parts by weight of morpholine.

From this wax was made three compositions; one composition containing the wax and .35 part by weight of TBZ, a second composition containing about 2 parts by weight of SOPP and a third composition containing 2 parts by weight of SOPP and 0.35 part by weight of TBZ.

Two hundred forty navel oranges were inoculated with *Penicillium digitatum* and the fruit divided into four separate groups containing 60 oranges each. To Group 1 was applied the wax formulation, to Group 2 was applied the wax formulation containing TBZ, to Group 3 was applied the wax formulation containing SOPP, and to Group 4 was applied the wax formulation containing TBZ and SOPP. After the wax formulation had been applied to the fruit the fruit were stored for three weeks at between 45° and 50° F. and for one week at 65° to 75° F. At the end of four weeks the fruits were inspected for sporulation control and decay control and analyzed for the residue of SOPP and TBZ on the fruit. The results of these tests are given in the table below.

| Formulation | Percent | | Residue of— | |
| --- | --- | --- | --- | --- |
| | Decay | Sporulation control | TBZ (p.p.m.) | AOPP (p.p.m.) |
| 1 | 49.5 | 0 | 0 | 0 |
| 2 | 7.1 | 25 | 1.5-2 | 0 |
| 3 | 25 | 0 | 0 | 5-7 |
| 4 | 8.6 | 90 | 1.5-2 | 5-7 |

It should be noted that in order to control decay and sporulation it is necessary that the correct residue of TBZ and AOPP be left on the fruit and therefore the percentages of AOPP and TBZ in the composition are not too important (except that weight ratio of TBZ and AOPP must be correct). However, it should be noted that it is preferred if TBZ is present in an amount of from 0.25% to 0.5% (say from 0.3% to 0.4%) and the AOPP is present in an amount of from 1.0% or 1.5% to 2.5% or 3%. The amount of resin can range from 10% to 20% and the amount of water from 60% to 90%.

In another example oranges were scratch inoculated with both *Penicillium italicum* and *Penicillium digitatum*. The fruit were divided into three substantially equal groups, and labeled Groups 1, 2, and 3. To the Group 1 oranges was applied the wax formulation given above, the Group 2 oranges were sprayed with water containing .125 parts of TBZ and thereafter there was applied the wax formulation containing 2 parts of AOPP, and to the Group 3 oranges was applied the wax formulation containing .35 part of TBZ and 2 parts of AOPP. All three groups of oranges were stored at 56° F. and 95-100% humidity for eleven days. The fruit were then inspected and the following results obtained:

| Formulation | Percent | | Residue of— | |
| --- | --- | --- | --- | --- |
| | Decay | Sporulation control | TBZ (p.p.m.) | AOPP (p.p.m.) |
| 1 | 31.25 | 5 | 0 | 0 |
| 2 | 3 | 20 | 0.4 | 6-7 |
| 3 | 3 | 97 | 1.8-2 | 6-7 |

There is no difference between Groups 2 and 3 in decay control but Group 3 gave 77% better sporulation control on decaying fruit.

It should be noted that the foregoing tests demonstrate that utilizing TBZ and AOPP in the correct amounts inhibit sporulation to a much greater extent than utilizing biphenyl (which inhibits sporulation about 40%).

The compositions and methods of the invention are equally effective on other fruit such as lemons, as demonstrated by the following example.

Lemons were inoculated and held overnight at 58° F. The lemons were then divided into two groups, labeled Group 1 and Group 2. The Group 1 lemons were sprayed with an aqueous composition containing 2% dissolved SOPP. The Group 2 oranges were also sprayed with the 2% SOPP composition and, immediately thereafter, sprayed with the wax composition described above containing .35% TBZ and 2% SOPP. The fruit were stored at 58° F. and 90% relative humidity and examined, the results being shown in the following table:

| Formulation | Percent | | Residue of— | |
| --- | --- | --- | --- | --- |
| | Decay | Sporulation control | TBZ (p.p.m.) | SOPP (p.p.m.) |
| 1 | 7.15 | 0 | 0 | 5 |
| 2 | 0.2 | 75 | 1.7 | 6-7 |

It will be understood that the foregoing description is only illustrative of the present invention and it is not to be limited thereto. Many other ways of applying the compositions of this invention, other wax formulations, etc.

We claim:

1. A method for simultaneously controlling molds and fungi, which cause decay of fruit, and inhibiting sporulation of said molds and fungi on said fruit, which comprises directly contacting the surface of said fruits with 2-(4-thiazolyl)benzimidazole and an alkali metal salt of ortho-phenyl phenol tetrahydrate, the amount of 2-(4-thiazolyl)benzimidazole applied to said fruit being sufficient to leave a residue on the surface of said fruit of 1 to 2 parts per million, by weight, and the amount of the alkali metal salt of ortho-phenyl phenol tetrahydrate applied to said fruit being sufficient to leave a residue on the surface of said fruit of from 5 to 10 parts per million, by weight, expressed as ortho-phenyl phenol.

2. A method according to claim 1 wherein the alkali metal is sodium.

3. A method according to claim 1 wherein the amount of 2-(4-thiazolyl)benzimidazole is sufficient to leave a residue of between 1.3 and 2 parts per million on said fruit and the amount of alkali metal salt of orthophenyl phenol tetrahydrate is sufficient to leave a residue of about 6 to 10 parts per million, by weight expressed as ortho-phenyl phenol.

4. A method according to claim 2 wherein the fruit is citrus fruit.

5. A method according to claim 1 wherein the alkali metal salt of ortho-phenyl phenol tetrahydrate is in solution in an aqueous medium and the 2-(4-thiazolyl)benzimidazole is in a dispersion in an aqueous medium.

6. A method according to claim 1 wherein the 2-(4-thiazolyl)benzimidazole and the alkali metal salt of ortho-phenyl phenol tetrahydrate is applied to the fruit in a wax composition consisting predominantly of water.

References Cited

UNITED STATES PATENTS 2,674,537    4/1954    Hopkins _____ 99—154

OTHER REFERENCES

The Merck Index, Eighth Edition, Oct. 28, 1968, p. 1035.

Plant Disease Reporter, Brown, Eldon et al., 15(2), 95–98 (1967).

S. LEON BASHORE, Primary Examiner

R. H. ANDERSON, Assistant Examiner

U.S. Cl. X.R.

252—402, 404; 260—302 H; 424—270